Nov. 15, 1960     J. A. BOEVING     2,959,921
GENERATOR OF COMBUSTION PRODUCTS UNDER PRESSURE
Filed Oct. 12, 1956     2 Sheets-Sheet 1

INVENTOR.
Joseph A. Boeving
BY Patrick D. Beavers
ATTORNEY.

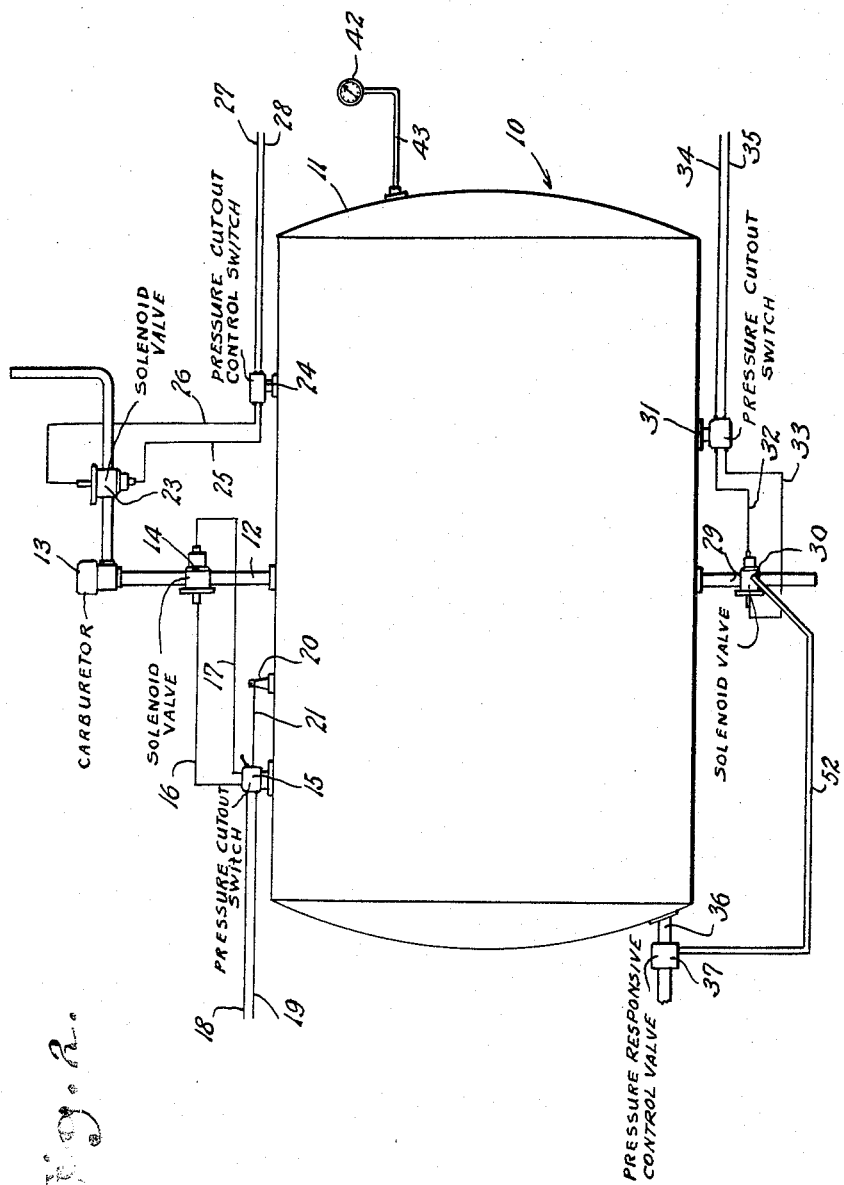

United States Patent Office 2,959,921
Patented Nov. 15, 1960

2,959,921
GENERATOR OF COMBUSTION PRODUCTS UNDER PRESSURE

Joseph A. Boeving, 620 Laurel St., Pine Bluff, Ark.

Filed Oct. 12, 1956, Ser. No. 615,676

1 Claim. (Cl. 60—39.68)

This invention relates to a gas compressor for furnishing pressure to any pneumatically operated motor or tool.

An object of the invention is to use a fast burning solid, liquid, or gaseous fuel gas in a high pressure vessel which when ignited will create combustion products under pressure to operate a pneumatically operated motor or tool.

Another object of the invention is to provide a device of this character that is inexpensive to manufacture, light in weight, small in size and efficient in operation.

With the above and other objects and advantages in view the invention consists of the novel details of construction, arrangement and combination of parts more fully hereinafter described, claimed and illustrated in the accompanying drawings wherein:

Fig. 2 is a side elevational view of one of the tanks or containers of the compressor.

Figure 1:
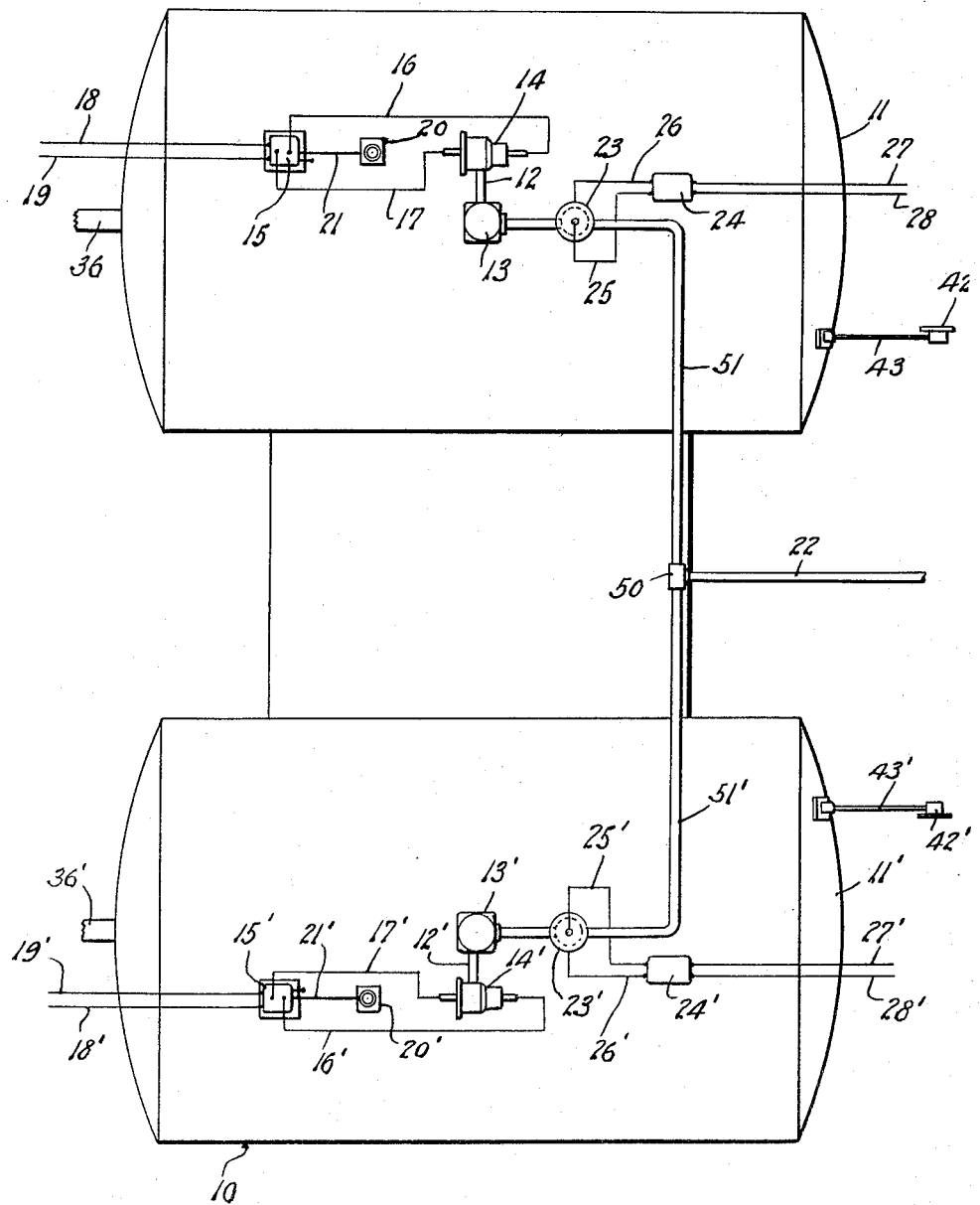
Fig. 1 is a top plan view of a gas compressor embodying the invention.

Referring more in detail to the drawings, wherein like parts are designated by like reference numerals, the reference numeral 10 is used to designate a compressor embodying the invention.

The gas compressor 10 comprises a pair of pressure tanks or containers 11 and 11', respectively, pipes 12 and 12', respectively, connected to each of the tanks in communication therewith. Carburetors 13 and 13' are connected to the upper ends of the pipes 12, and 12', respectively, solenoid valves 14 and 14' are interpolated in the pipes 12 and 12', respectively.

Pressure responsive cutout switches 15 and 15' are mounted on the tanks 11 and 11', respectively, the switches 15 and 15' are connected to their respective solenoid valve 14 or 14', respectively, by wire leads 16 and 16' and 17 and 17', respectively. Electrical current supply lines 18 and 18' and 19 and 19' are connected to the pressure responsive cutout switches 15 and 15', respectively, to supply current thereto.

Spark plugs 20 and 20' are connected to the tanks 11 and 11', respectively, and electrical leads 21 and 21' connect the spark plugs 20 and 20' to the pressure responsive cutout switches 15 and 15', respectively.

A fuel line 22 from a fuel tank, not shown, is connected to a T 50 and fuel lines 51 and 51' are connected to the carburetors 13 and 13', respectively, and solenoid valves 23 and 23' are interpolated in the fuel lines 51 and 51', respectively.

Pressure responsive cutout control switches 24 and 24' are connected to the tanks 11 and 11', respectively, and leads 25 and 25' and 26 and 26' connect the switches 24 and 24' to the solenoid valves 23 and 23', respectively. Electrical current supply lines 27 and 27' and 28 and 28', respectively, are connected to the switches 24 and 24', respectively.

Pressure relief pipes 29 are connected to the tanks 11 and 11', respectively, and a solenoid valve 30 is interpolated in each of the pipes 29. A second pressure responsive cutout switch 31 is connected to each of the tanks 11 and 11', respectively, and leads 32 and 33, respectively, connect each of the pressure responsive cutout switches 31 to the solenoid valves 30. Electrical current supply lines 34 and 35, respectively, are connected to the pressure responsive cutout switches 31.

Outlet pipes 36 and 36' are connected to the tanks 11 and 11', respectively, and a pressure responsive control valve 37 is interpolated in each of the pipes 36 and 36', respectively. The valve 37 acts as a metering valve for the solenoid valve 30 which is set to open at an operating pressure over and above the pressure issuing from the valve 37. Thus the valve 37 is connected by bleed line 52 to the solenoid valve 30, as shown in Fig. 2, for the control of the valve 30.

While a pressure responsive operated valve is shown, an electrically operated valve may also be used if desired.

Pressure gauges 42 and 42' are connected to each of the tanks 11 and 11', respectively, by conduits 43 and 43', respectively.

In operation with either of the tanks 11 or 11', respectively, empty, the pressure responsive cutout switch 24 is energized to operate solenoid valve 23 to open the fuel line 51 and the carburetor 13 will meter fuel into the tank 11.

When a predetermined amount of fuel under pressure has entered the tank 11, and the pressure within the tank 11 has been increased by the entrance of such fuel under pressure the pressure cutout switch 15 will close the solenoid valve 14.

After the valve 14 has been closed, spark plug 20 will be energized to ignite the fuel under pressure in the tank 11 to create an explosion. The gas under pressure thus created by such explosion will then escape from the tank 11 through the pressure responsive control valve 37 into the motor or tool or device being operated from either of tanks 11 or 11'.

Solenoid valve 30 is set to open at an operating pressure of 5 lbs. over and above the gas under pressure issuing from the pressure responsive control valve 37 which is set for maximum operating pressure of the motor or tool which is being operated by the gas under pressure from either of the tanks 11 or 11', respectively. When all the gas under pressure in the tank 11 has become exhausted, the procedure set forth is repeated with tank 11'. As previously stated, the pressure from the tanks 11 and 11' are metered to the valve 30 so that the pressure in the tanks 11 and 11' will never exceed more than 5 pounds over and above the pressure issuing from the valve 37.

The gas under pressure created by the explosion in either of the tanks 11 or 11', respectively, is discharged through outlet pipes 36 or 36' to a common storage tank or to a tool or other device that is desired to be operated by the gas under pressure from the compressor 10. The carburetors 13 and 13' are set so that as the gas under pressure in one tank is exhausted, fuel under pressure will be fed into that tank. When the fuel under pressure is ignited, the explosion created in that tank will cause a pressure rise in that tank and the process will be repeated as the gas under pressure is exhausted in either of the tanks. Thus when the gas under pressure is decreased in either tank, an explosion will be caused in that tank to rebuild the pressure. Each tank works independently, building its own pressure.

It is believed that from the foregoing description, the operation and construction of the invention will be apparent to those skilled in the art and it is to be understood that changes in the minor details of construction, arrangement and combination of parts may be resorted to provided they fall within the spirit of the invention and scope of the appended claim.

Having thus described the invention what is claimed as new and desired to be secured by Letters Patent is:

A generator of combustion products under pressure comprising a tank, a fuel supply pipe connected to said tank for supplying fuel under pressure to said tank, a carburetor in said fuel supply pipe, a first pressure responsive cutout switch connected to said tank, a first solenoid valve mounted in said supply pipe outwardly of said carburetor and electrically connected to said first pressure responsive cutout switch so that said first solenoid valve will be opened by the decrease of fluid under pressure within said tank, a second solenoid valve mounted in said fuel supply pipe between said carburetor and said tank, a second pressure responsive cutout switch connected to said tank and electrically connected to said second solenoid valve so that said second solenoid valve will be opened by the increase of fluid under pressure within said tank, a spark plug mounted in said tank and electrically connected to said second pressure responsive cutout switch, an outlet pipe connected to said tank, a pressure responsive cutout switchover valve mounted in said outlet pipe and said pressure responsive control valve will be opened by the decrease of gas under pressure in said tank, a pressure relief pipe connected to said tank, a third solenoid valve mounted in said relief pipe, and a third pressure responsive cutout switch connected to said tank and electrically connected to said third solenoid valve so that said valve is opened by increase of pressure in said tank, said first pressure responsive cutout switch and said pressure responsive control valve being closed respectively upon decrease of pressure within the tank and said second and third pressure responsive cutout switches being operable, respectively, at relatively higher pressures in the tank.

References Cited in the file of this patent

UNITED STATES PATENTS

| | | |
|---|---|---|
| 292,546 | Dieckmann | Jan. 29, 1884 |
| 1,014,797 | Wurtz | Jan. 16, 1912 |
| 1,074,209 | Roy | Sept. 30, 1913 |